United States Patent [19]
Goldy

[11] Patent Number: 5,809,834
[45] Date of Patent: Sep. 22, 1998

[54] MOTION ROLLER BEARING ASSEMBLY

[75] Inventor: Richard K. Goldy, Canton, Mich.

[73] Assignee: MRBA Company, Detroit, Mich.

[21] Appl. No.: 733,979

[22] Filed: Oct. 18, 1996

Related U.S. Application Data

[60] Provisional application No. 60/019,929 Jun. 14, 1996.

[51] Int. Cl.$^6$ .................................................. F16H 29/02
[52] U.S. Cl. ............................ 74/89.22; 384/23; 384/44; 296/155
[58] Field of Search ............................... 74/89.18, 89.22, 74/89.12; 384/451, 23, 38, 43, 44, 55, 57; 296/155

[56] References Cited

U.S. PATENT DOCUMENTS

| | | | |
|---|---|---|---|
| 4,157,846 | 6/1979 | Whitcroft | 296/155 |
| 4,844,624 | 7/1989 | Teramachi | 384/45 |
| 4,932,715 | 6/1990 | Kramer | 296/155 |
| 5,140,316 | 8/1992 | Deland et al. | 296/155 |
| 5,152,614 | 10/1992 | Albert et al. | 384/45 |
| 5,161,896 | 11/1992 | Hofling et al. | 384/8 |
| 5,161,897 | 11/1992 | Ng et al. | 384/44 |
| 5,207,114 | 5/1993 | Salisbury, Jr. et al. | 74/89.22 |
| 5,308,170 | 5/1994 | Yamaguchi et al. | 384/45 |
| 5,316,365 | 5/1994 | Kuhlman et al. | 296/155 |
| 5,322,339 | 6/1994 | Dubernard | 296/155 |
| 5,326,335 | 7/1994 | Takei | 476/67 |
| 5,375,931 | 12/1994 | Teramachi | 384/45 |
| 5,411,334 | 5/1995 | Takei et al. | 384/45 |
| 5,611,248 | 3/1997 | Peltier | 74/89.22 |

Primary Examiner—Rodney H. Bonck
Assistant Examiner—David M. Fenstermacher
Attorney, Agent, or Firm—Young & Basile, P.C.

[57] ABSTRACT

A combination linear and circular motion roller bearing assembly have a rail and a pair of tracks, each located along a side wall of the rail. The rail forms a contiguous path having both linear and circular portions. A slider bearing assembly is movably attached to the rail. The slider bearing assembly has internal continuous paths that correspond to the tracks. Each internal path has a plurality of ball bearings therein. Each internal path has an opening adjacent the corresponding track and a tapered insert therein for exposing a predetermined number of ball bearings to the track to allow rolling movement with a respect to the track as the slider bearing assembly moves along the rail.

24 Claims, 4 Drawing Sheets

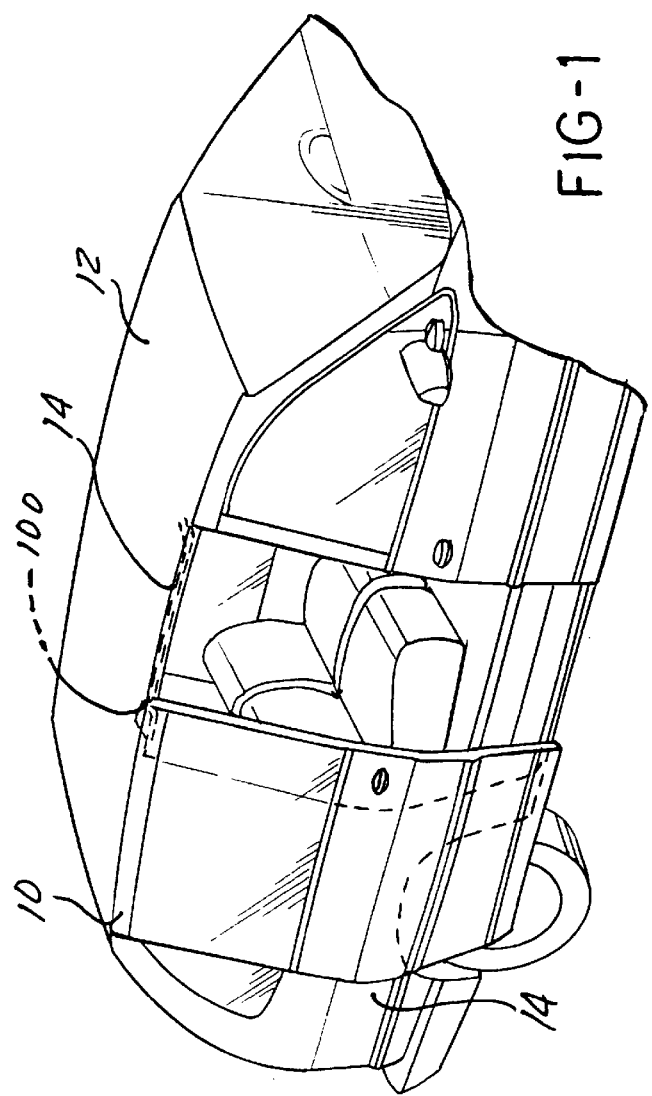
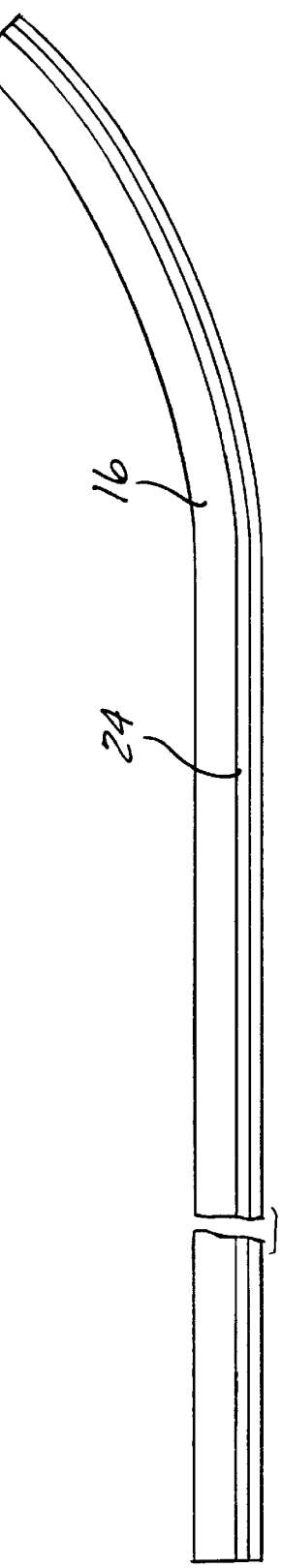
FIG-1
FIG-2

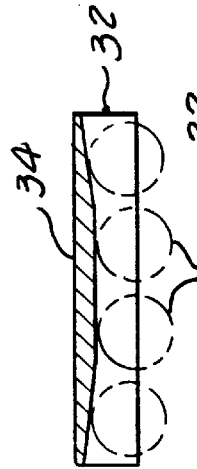
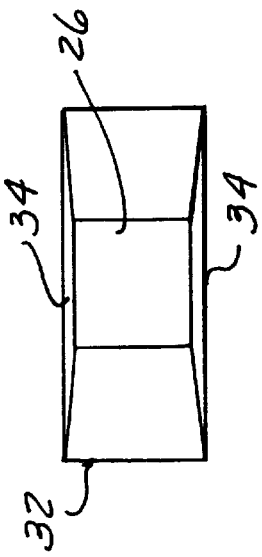
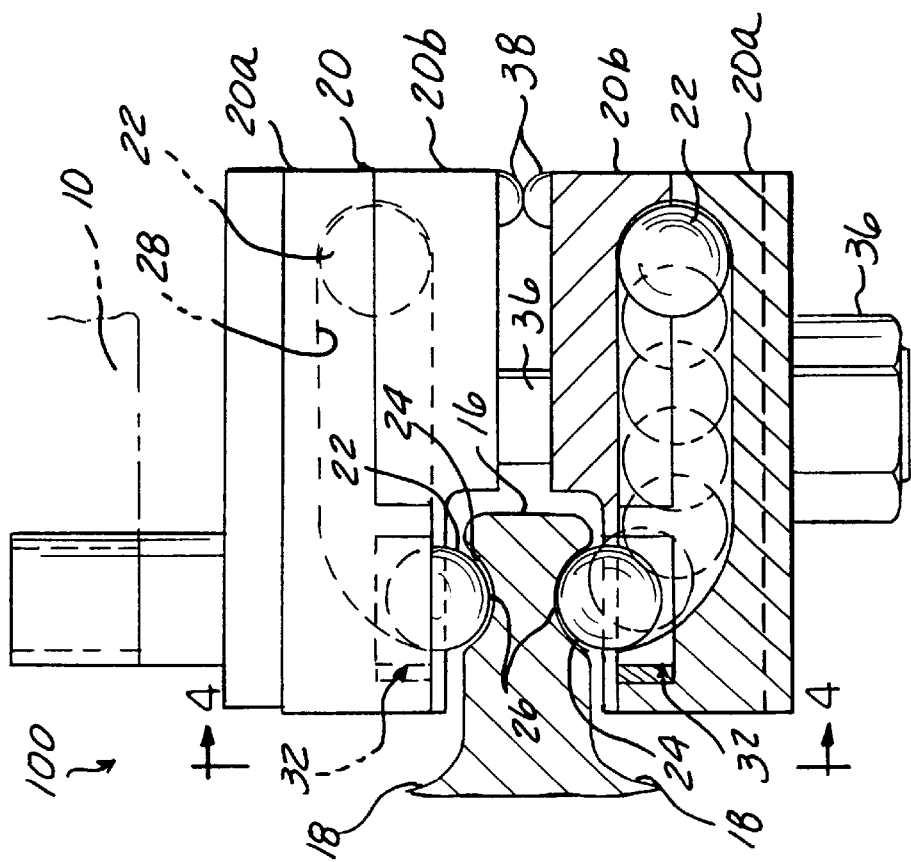

MOTION ROLLER BEARING ASSEMBLY

This application claims the benefit of U.S. Provisional Application Ser. No. 60/019,929, filed on Jun. 14, 1996.

FIELD OF THE INVENTION

The invention is a combination linear and circular motion roller bearing assembly.

BACKGROUND OF THE INVENTION

Currently there are a number of linear motion drive systems and circular motion bearing systems available in the market that provide a light, smooth motion with high accuracy over an extended period of time. Each of these systems are limited in their applications. Linear motion bearing systems provide reciprocal motion, but do not provide for arcuate or circular motion. Likewise, circular motion bearing systems are manufactured such that the track for the movable block is ground to provide only constant arcuate motion. Therefore, in applications where an oval track or a partially linear and partially circular track are desired, the aforementioned bearing systems are inadequate.

In the automotive manufacturing field, automatic sliding side doors on vans have provided another application where a bearing system having the combination of linear as well as circular motion is required. In such an application, the side van door must be capable of moving partially away from the side of the vehicle and then linearly along the side of the van in a spaced relationship from the van. Current motion bearing systems do not provide the capability to move arcuately for a portion of the travel distance and to move linearly for another portion of the travel distance in a contiguous path. In addition, the sliding side van door must provide stability throughout its movement without any torsional or twisting motion of the door. Many sliding doors of the prior art use a roller and track system in which a roller attached to an upper or lower portion of the door moves within a groove formed in the frame of the vehicle. This system does not promote stability in the door as it opens and closes.

SUMMARY OF THE INVENTION

The current invention addresses the aforementioned concerns by providing an essentially linear motion roller bearing assembly having the capability of linear and circular or partial circular motion while providing stability to the load bearing member. In particular, the roller bearing assembly is applicable for use in a vehicle having a sliding door such as a side van door that slides out and away from the vehicle body as it is opened. The combination linear and circular motion roller bearing assembly includes a center rail with a pair of tracks provided at opposite side surfaces of the center rail. Each track provides a channel-like surface. In the application of a sliding van door, the track may be integral of the frame above the sliding door. The track is essentially linear but may include at least one circular portion. In the application of a sliding van door, it is conceivable to have a curved path for the rail as the door is swung away from the vehicle; and then proceed along a linear path alongside of the vehicle.

A slider bearing assembly is disposed over the rail such that a portion of the slider bearing is adjacent each of the tracks located on opposite sides of the rail. Within the slider bearing assembly is an essentially circular and continuous path for each track, wherein the continuous path is essentially enclosed to maintain a plurality of ball bearings therein. The slider bearing assembly has an opening along each track such that only a predetermined number of ball bearings are exposed to and in contact with each track at any one time. The predetermined number of ball bearings may rotate in the channel-like surface within the track of the rail and bear a load against the track surface. The plurality of circulating balls move along the circular and continuous paths of the slider bearing assembly and are located between the rolling surfaces of the slider bearing assembly and the rolling surfaces of the track rail to bear a load.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a motion roller bearing assembly of the current invention as used on a sliding van door to illustrate one application;

FIG. 2 is an illustration of a typical formation of a track formed on a rail having a linear portion and a circular portion;

FIG. 3 is a side view of the combination linear and circular motion bearing assembly illustrating a pair of tracks on the rail and the slider bearing assembly thereon;

FIG. 6a is a side view of a metal insert for the slider bearing assembly;

FIG. 6b is an end view of the metal insert;

FIG. 6c is a top view of the metal insert;

DESCRIPTION OF THE PREFERRED EMBODIMENT

Figure 4:
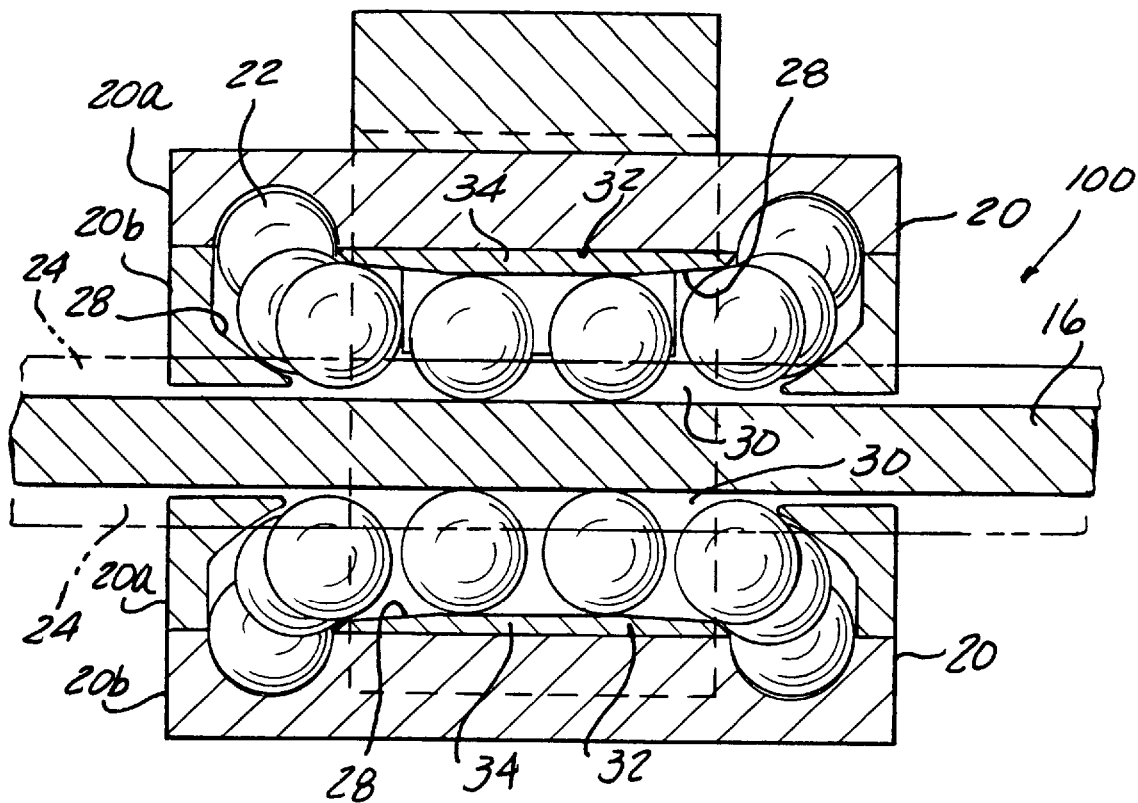
FIG. 4 is the assembly of FIG. 2 taken along lines 3—3 of FIG. 3.

In an application such as for a sliding van door 10 generally located on the side of the vehicle 12, it is desirable to have the path of the door 10 as it is sliding open to move initially away from the side body 14 of the vehicle 12 and then axially along a parallel plane spaced from the side body 14 of the vehicle 12. As the door 10 moves away from the side body 14, the door 10 takes a partially circular path. When the door 10 is spaced away from the side body 14 to clear it, the door 10 continues to slide parallel to the side body 14 to provide an opening into the vehicle 12. When the door 10 is closed, the door 10 follows the same path in reciprocating fashion. FIG. 2 shows such a path of a rail 16 having a track 24 formed thereon that requires both linear motion and circular motion of the sliding van door 10. FIG. 2 illustrated only one track 24 formed on the rail 16, but in fact the rail 16 has a symmetrical track 24 on its opposing sidewall as better shown in FIG. 3.

Figure 5:
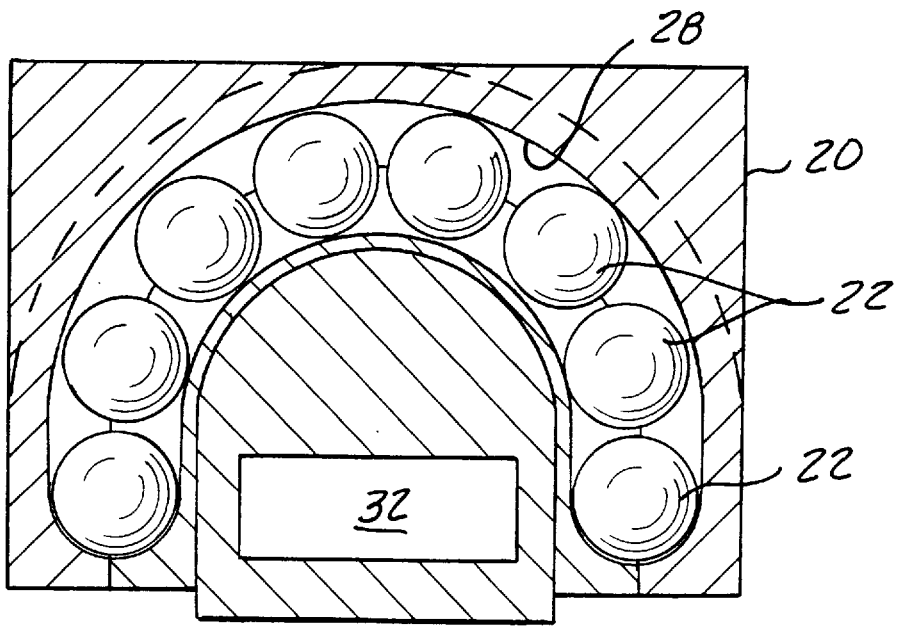
FIG. 5 is a top view of the slider bearing assembly showing the continuous path of the ball bearing therein.

Therefore, in this application as well as others, it is desirable to provide a motion bearing assembly 100 that allows for both linear and circular motion within the same contiguous path movement. FIG. 3 shows the linear and circular motion roller bearing assembly 100. A side view of roller bearing assembly 100 shows a rail 16 is attached to the frame 18 of the vehicle. The rail 16 has a track 24 on each side wall thereof. Each track forms a channel-like surface 26. A slider bearing assembly 20 has ball bearings 22 therein in communication with the track 24. The slider bearing assembly 20 is attached to the sliding door 10. As seen in FIGS. 3 through 5, the slider bearing assembly 20 has a continuous internal path 28 for receiving a plurality of ball bearings 22 corresponding to each track 24 Each internal path 28 has a generally circular or oval configuration. An opening 30 is provided on each side of the slider bearing assembly 20, adjacent the track 24 so that each path 28 of the ball bearings 22 is exposed to the loaded bearing tracks 24. As can be seen in FIG. 4, the opening 30 of the path 28 exposed to the track 24 of the rails 16 is configured to only accommodate a predetermined number of ball bearings 22 fully within the opening on each side of the slider bearing assembly 20 at any one time. This is further provided for by a metal insert 32 installed in the opening 30 of the internal path 28. As seen in FIGS. 6a–6c, the metal insert is tapered at its center portion 34 to restrict the number of ball bearings 22 that are in contact with surface 26 of track 24 to a maximum of two ball bearings 22. Therefore, at most, only the predetermined number of ball bearing 22 are in contact with each track 24 at any one time.

In an application such as a sliding van door 10 wherein the load is not heavy, (the sliding van door 10 is approximately 100 pounds) a large number of load bearing ball bearings 22 exposed to and in communication with the track 24 is not necessary. When a plurality of ball bearings 22 are in communication within the track 24, circular motion is inhibited. Previous tracks forming strictly circular paths required slider bearing assemblies that were ground on a curve to accommodate circular motion. These slider bearing assemblies were restricted to circular motion and could not also accommodate straight linear motion. By employing an opening 30 to the path 28 of the track 24 with a tapered metal insert 32 which only allows the predetermined number of ball bearings 22 into the channel-like track surface 26 of the rail 16, the limited number of ball bearings 22 located adjacent each other in track 24 provide sufficient fluidity to allow the slider bearing assembly 20 to follow a linear as well as circular path. The predetermined number of ball bearings on the channel-like track surface 26 (FIG. 4 shows two ball bearings 22 in track 24) and size of the ball bearings 22 are dependent on a variety of factors including load required of the assembly and the radius of the circular portion of the track 24. It is only necessary to limit the number of ball bearings 22 within the track surface 26 to the maximum of ball bearings 22 that can move along the given circular track. Circular paths having a small radius will accept only one or two ball bearings 22 within the channel-like track surface 26. Circular paths having a larger radius will accept more ball bearings on track surface 26 to travel the circular path.

The slider bearing assembly 20 is easily manufactured from a polyurethane or other similar plastic material. Since the only load bearing area of assembly 20 is at the opening 30 where the ball bearings 22 contact the surface 26 of the track 24, the metal insert 32 is the only portion of the slider bearing assembly 20 that requires a steel or other durable metallic material.

The ball bearings 22 may be made of a steel or standard plastic material. The slider bearing assembly 20 is formed by two molded pieces 20a, 20b that are connected together to form a single internal path 28. A pair of these two molded pieces 20a, 20b are formed and connected together by a nut and bolt 36 arrangement. Molded piece 20b includes a small module 38 proximate one end, such that when the pair of molded pieces are connected by the nut and bolt 36, the modules 38 of each pair meet to provide a rocking pivot point for the slider bearing assembly 20.

Figure 8:
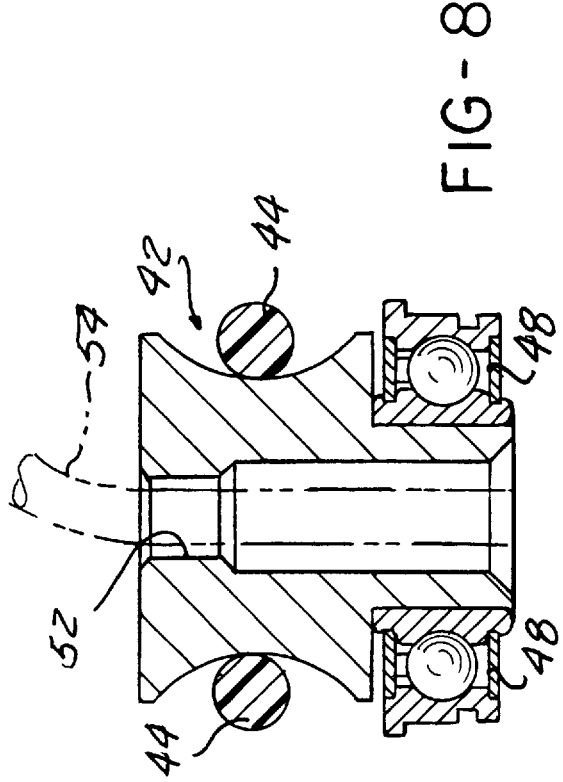
FIG. 8 is a side view of the pulley drive unit.
Figure 7:
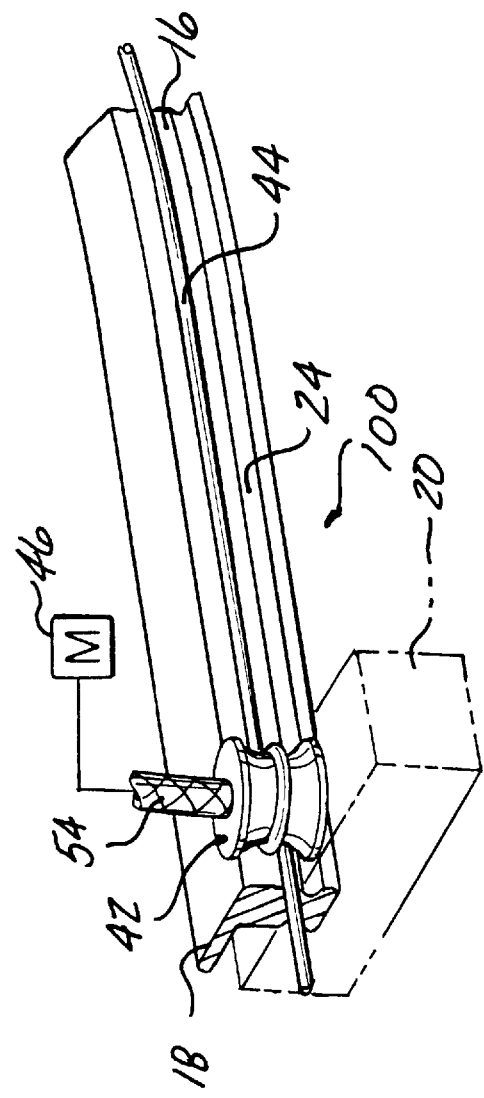
FIG. 7 is a perspective view of a pulley drive unit for mounting on the slider bearing assembly.

Although the slider bearing assembly 20 may be manually driven to move along rail 16, such as when an individual physically opens a sliding van door, driving means 40 may be provided for the motion bearing assembly 100 by means of a motor driven pulley unit 42. FIG. 7 shows a perspective view of a pulley drive unit 42 which is mounted to the slider bearing assembly 20. The pulley drive unit 42 is mechanically or electrically attached to a motor 46 that can be actively or remotely energized. In one embodiment, as seen in FIG. 8, the pulley drive unit 42 has first connection means 48 for attachment to the slider bearing assembly 20. The pulley drive unit 42 does not necessarily need to be connected to the bearing but may be located proximate to the slider bearing assembly 20 such that the movement of the pulley drive unit 42 moves the slider bearing assembly 20. The pulley drive unit 42 further has a through aperture 52 for receiving rod 54 that communicates with the motor 46. The pulley drive unit 42 has an essentially concave tubular outer surface and is circularly entwined by a flexible wire or string 44 that follows the path of the rail 16. String 44 may be constructed of braided polypropylene material that is coated with a urethane material for traction. The flexible string 44 will generally extend the length of the desired travel of the door opening and is secured at both ends, which will correspond to the rail 16 length. In response to a signal or mechanical application, the motor 46 is started and turns rod 54. The motor is capable of reciprocal motion such that it may turn the rod 54 in either a clockwise or counter clockwise direction. As rod 54 turns, the pulley drive unit 42 rotates in the same direction. As the pulley drive unit 42 is rotated, it travels reciprocally along the path of the flexible string 44. As the pulley drive unit 42 travels the length of string 44, the slider bearing assembly 20 moves along the rail 16 with drive unit 42. FIG. 8 shows a side view of the pulley drive shaft unit 42 to illustrate the first connection means 48 to the motion roller bearing assembly 100, and to clearly show the concave surface on the pulley drive unit 42 for the flexible string 44.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An assembly for providing linear and circular movement of an apparatus comprising:

a rail having a curved portion and a straight portion contiguous therewith;

a pair of tracks formed on said rail;

a slider bearing movably attached to said rail and having a portion communicating with each of said tracks, said slider bearing having a pair of internal continuous paths and a plurality of ball bearings therein, said each continuous path having an open portion adjacent said respective track, wherein each open portion adjacent the tracks has identical load bearing surface configurations; and means for limiting a number of ball bearings communicating with said track.

2. The assembly of claim 1, wherein said rail has a pair of sidewalls, each sidewall having a track formed thereon.

3. The assembly of claim 1, further comprising a pulley drive unit communicating with a motor for driving said slider bearing with respect to said rail, wherein said pulley drive unit communicates movement to said slider bearing.

4. The assembly of claim 1, further comprising a pulley drive unit communicating with a motor for driving said slider bearing with respect to said rail, wherein said pulley drive unit is connected to said slider bearing.

5. The assembly of claim 4, wherein said pulley drive unit has a concave tubular portion and a flexible wire entwined thereabout, wherein said flexible wire extends essentially along an entire longitudinal length of the rail and is fixedly secured at both longitudinal ends.

6. The assembly of claim 5, wherein said pulley drive unit revolves when said motor is energized to move reciprocally along the flexible wire.

7. The assembly of claim 1, wherein said slider bearing includes a rocking pivot point spaced from the open portion.

8. The assembly of claim 1, wherein the limiting means includes a tapered insert located in the open portion.

9. The assembly of claim 8, wherein only the tapered insert of the slider bearing is made of a metallic material.

10. The assembly of claim 1, wherein a portion of the curved rail defined by an arc has a first curved track and a second curved track lying in spaced parallel planes with respect to one another.

11. The assembly of claim 1, wherein said rail has a single pair of tracks.

12. A pulley drive unit in combination with a frame having rail attached thereto for translating rotating motion to linear motion of a door along said rail, the combination comprising:

a rotatable member;

a flexible string having a length defining a path of travel, said string having secured ends stationary with respect to said rail and having a portion entwined around said rotatable member; and means for rotating said rotatable member, wherein said rotatable member moves along the length of the flexible string for moving said door linearly a long said rail.

13. The pulley drive unit of claim 12, wherein said rotatable member has a concave outer surface to maintain the entwined portion of the flexible string thereon.

14. The pulley drive unit of claim 12, wherein the means for rotating includes a motor communicating with said rotatable member.

15. The pulley drive unit of claim 14, further comprising:

means for communicating rotary motion from said motor to said rotatable member; and said rotatable member having a center aperture therethrough for receiving said means for communicating with said motor.

16. The pulley drive unit of claim 12, further comprising connection means on the rotatable member for connecting said rotatable member to the moveable member.

17. The pulley drive unit of claim 12, wherein said string is constructed of a polypropylene material having a urethane material coating thereon.

18. An apparatus in combination with a frame for driving a sliding door of said vehicle comprising:

at least one rail attached to the frame and extending along a fixed path, said fixed path having a linear path portion and a non-linear path portion;

an elongated cable extending along said rail and anchored at each longitudinal end to the frame; and capstan means supported for movement along said rail in response to frictional engagement with respect to said cable, said capstan means connected to said sliding door for driving said sliding door along said fixed path through said linear path portion and said non-linear path portion.

19. The apparatus of claim 18 wherein said capstan means further comprises:

a spool-shaped cylinder rotatable about an axis; and reversible motor means for rotating said cylinder while in frictional engagement with said cable.

20. The apparatus of claim 18 further comprising:

recirculating ball bearing means for connecting the capstan means to the rail, said recirculating ball bearing means including a housing having at least one recirculating aperture extending therethrough, a plurality of ball bearings disposed within said recirculating aperture and an opening through said housing in communication with said aperture of sufficient size to allow simultaneous engagement of at least two ball bearings with said rail.

21. The apparatus of claim 20 further comprising:

an elongated insert disposed extending longitudinally along the recirculating aperture in the housing opposite said opening, said insert having tapered longitudinal ends flaring into an intermediate portion of greater thickness than the longitudinal ends to urge said ball bearings outwardly through said opening in said housing and into engagement with said rail.

22. The apparatus of claim 21 further comprising:

said insert having a surface facing said opening with a concave arcuate contour extending longitudinally therealong to guide said ball bearings with respect to said opening.

23. The apparatus of claim 22 further comprising:

said concave arcuate contour having a lateral width greater at said longitudinal ends than at said intermediate portion.

24. The apparatus of claim 20 further comprising:

said rail having at least two tracks formed on opposite faces thereof for engaging with said ball bearings as said sliding door moves along said fixed path; and said housing having first and second recirculating apertures extending therethrough, a plurality of ball bearings disposed within each of said first and second recirculating apertures, and first and second openings through said housing in communication with said first and second apertures respectively, each of said first and second apertures of sufficient size to allow simultaneous engagement of at least two ball bearings with said respective first and second track in said rail, said housing including a rocking pivot point disposed between said first and second recirculating apertures.

* * * * *